United States Patent [19]
Xiang

[11] Patent Number: 5,866,241
[45] Date of Patent: Feb. 2, 1999

[54] MICROSCOPE SLIDE WITH COLORFROST AND NON-COLORFROST SURFACES

[76] Inventor: Ming H. Xiang, 3005 Jonquilla Ct., Herndon, Va. 20171

[21] Appl. No.: 932,621

[22] Filed: Sep. 17, 1997

[51] Int. Cl.[6] .................................................. G02B 21/34
[52] U.S. Cl. ........................................... 428/210; 356/244
[58] Field of Search .............................. 428/210; 356/244

[56] References Cited

U.S. PATENT DOCUMENTS

| | | | |
|---|---|---|---|
| 3,551,023 | 12/1970 | Brackett | 350/95 |
| 4,481,246 | 11/1984 | Melisz et al. | 428/210 |
| 4,624,882 | 11/1986 | Melisz | 428/210 |
| 4,679,914 | 7/1987 | Rosenberg | 350/534 |
| 5,089,315 | 2/1992 | Rosenberg | 428/192 |
| 5,225,266 | 7/1993 | Menzel | 428/192 |
| 5,683,786 | 11/1997 | Kavanaugh | 428/210 |

*Primary Examiner*—William Krynski
*Assistant Examiner*—Cathy F. Lam
*Attorney, Agent, or Firm*—Dowell & Dowell, P.C.

[57] ABSTRACT

A microscope slide which is treated to provide frosted or etched surfaces along opposite sides thereof where one of the frosted surfaces is covered with a color coating and wherein the treated surfaces may be selectively marked with conventional ink or pencil markings.

4 Claims, 1 Drawing Sheet

MICROSCOPE SLIDE WITH COLORFROST AND NON-COLORFROST SURFACES

BACKGROUND OF THE INVENTION

1. Field of the Invention

This invention is generally directed to microscope slides and, more particularly, to slides having a portion of both the upper and lower surfaces thereof treated so as to create etched or frosted surface portions wherein one of the upper or lower surface portions has applied thereto a color coating to provide a contrast with respect to laboratory markings and which facilitates coding of slides in laboratory use and wherein both treated surfaces may receive marking indicia.

2. History of the Related Art

It has been known to provide microscope slides with strips of material which are applied to identify or code the slides with respect to samples applied thereto. In the most basic embodiments, slides are marked with a tape or label which can be marked with indicia identifying the sample or which provides other information with respect to the sample. Unfortunately, labels or other adhesive tabs which are applied to slides may easily be removed or separated during handling and therefore are not reliable for many laboratory uses.

To overcome the problems with labels applied to slides, it has been known to etch or frost a surface portion of a glass slide in order to enable hand or printed indicia to be directly applied to the treated surface. This allows a more permanent marking to be associated with the slides which cannot be separated or accidentally removed during handling. Unfortunately, markings applied to etched surfaces of conventional glass slides do not assure permanent retention of identification markings and also do not provide sufficient visual identification to ensure that laboratory technicians can easily identify specific slides.

To overcome the deficiencies with respect to prior art microscope slides which include a frosted portion as a marking surface, U.S. Pat. No. 4,481,246 to Melisz et al. discloses providing a raised marking surface which is more absorptive to marking materials and which is pigmented to provide visual contrast to markings on the surface. The patent proposes that the raised marking surfaces, which are provided across a portion of the surface of the slide, would be resistant to solvents, reagents, stains or chemicals commonly utilized in the laboratory industry. The patent discloses applying an epoxy or other resinous material as a coating to a portion of a glass slide and also including a pigment to provide contrasting background for better visibility with respect to markings applied to the treated surface of the slide. The epoxy coating is provided to accept markings from commonly used instruments including felt-tip pens, ballpoint pens and pencils. The patent notes that the coatings form an absorptive surface holding and retaining the markings during laboratory testing and other procedures in addition to being resistant to laboratory solvents and chemicals commonly used and thus would protect the integrity of the markings during the life of the slide.

Unfortunately, such coatings are applied as an additional surface which is raised with respect to the remainder of the slide and therefore can easily be scratched or damaged during normal handling or stacking of slides. Therefore, not only do the surface coatings provide a problem with respect to storage of a plurality of slides, but the coating of the surface of the slides is easily damaged during normal handling.

SUMMARY OF THE INVENTION

The present invention is directed to microscope slides which are formed of a glass material having upper and lower surfaces wherein a portion of both the upper and lower surfaces are treated, such as by sandblasting or etching, to form frosted or etched surface areas which do not extend outwardly beyond the planes defined by the upper and lower surfaces of the slides and, in a preferred embodiment, may be somewhat recessed with respect to the remaining portion of the upper and lower surfaces of the slides. One of the frost areas of the upper or lower surfaces of each slide is provided with a coating of a color pigment to allow color coding of the slide. Both the treated surface areas on the upper and lower surfaces of the slide may receive hand or printed indicia applied thereto by way of marking pen, pencil or conventional ink pen.

It is the primary object of the present invention to provide microscope slides which have an increased utility with respect to allowing markings to be applied thereto in such a manner so as to reduce the possibility of the markings being smudged, erased or otherwise damaged by the normal handling, stacking or storing of the slides in a laboratory environment.

It is a further object of the present invention to provide laboratory glass slides which are provided with upper and lower frosted surface portions which may be utilized to receive marking indicia and wherein one of the upper and lower frosted surface portions is coated with a color to facilitate coding of the glass slides and wherein the coated surface portion is more receptive to ink-type markings and the uncoated treated surface portion is more receptive to conventional pencil type indicia.

DESCRIPTION OF THE PREFERRED EMBODIMENT

The present invention is directed to slides utilized in laboratory, hospital and other environments wherein the slides are preferably formed of a glass material which is inert to chemicals and other substances normally encountered in such environments. The slides are designed to provide enhanced identification and color coding through a procedure of selective coating of one of two treated surfaces thereof and whereby the surfaces may be utilized to receive both ink markings and more graphic coatings such as applied by pencil.

Figure 1:
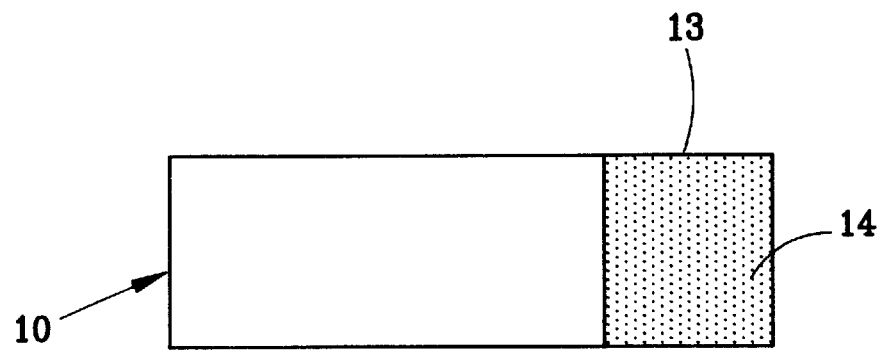
FIG. 1 is a top plan view of the present invention showing a glass slide having a segment or portion thereof mechanically or chemically treated to form a frosted surface over which a color coating has been applied.
Figure 2:
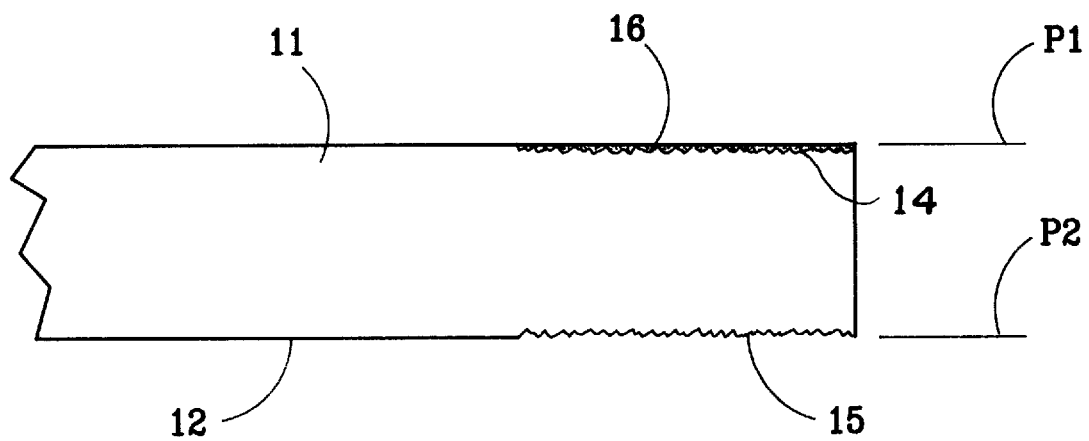
FIG. 2 is an enlarged partial side elevational view of the slide of FIG. 1 showing the upper treated surface with a color coating applied thereto and an underlying surface portion of the slide which has also been mechanically or chemically treated to form an etched or frosted surface and which is uncoated for receiving manually applied indicia in accordance with the teachings of the present invention.

With respect to the drawing figures, each laboratory slide includes a body 10 which, in the drawing figures, is shown as being rectangular. The slide includes an upper surface 11 and a lower surface 12. The slide may have substantially any dimension, however, conventional glass microscope slides are approximately 75 mm by 25 mm or 3" by 1" in dimension and approximately 1 mm in thickness. As shown in FIG. 2, one end portion or segment 13 of the slide is mechanically or chemically treated, such as by sandblasting or chemical etching, in order to form a frosted or roughened surface area along both the upper and lower surfaces of the slide, as shown at 14 and 15. As shown in FIG. 2, the treated or frosted surface areas do not extend outwardly beyond the planes $P_1$ and $P_2$ defined by the remaining portion of the upper and lower surfaces, and, in a preferred embodiment, these areas are somewhat recessed with respect to the planes defined by the upper and lower surfaces of the glass slide. For purposes of definition, these surface areas within the specification and the claims will be referred to as "frosted surface areas."

The upper frosted surface area 14 shown on the slide is provided with an ink or other color coating 16 in such a manner that the coating does not extend outwardly beyond the plane $P_1$ and preferably remains below the plane $P_1$ defining the upper surface of the slide so that, when slides are stacked upon one another, the surface coating cannot be adversely affected by a sliding contact of one slide relative to another. This will protect the color coating and any indicia applied thereto from being accidentally smudged or removed during normal laboratory handling.

The lower frosted surface area shown at 15 is not color coated. The selective non-coating of the lower surface area allows the placement of less permanent indicia, such as pencil markings, to be applied thereto, whereas the color or ink coated surface portion $14/16$ is such as to readily receive not only pencil markings but markings from ink such as from stamps or pens applied thereto.

With the present invention, the slide is provided along the upper surface with a color coated frosted surface for visual contrast to assist in laboratory identification and which also allows markings to be received such as applied with a pen. The reverse side, at the same end, is also treated, however, without color and therefore provides an additional area for laboratory markings such as by a pencil. The combination of both a coated treated surface area and a non-coated treated surface area on a single slide provides increased space for purposes of receiving notations applied by laboratory technicians.

The frosted surface areas not only provide a rough surface which helps to enhance and retain markings, but the upper color coated area readily receives indicia applied in ink. Further, the frosting or treating of the surface of the glass slide enhances the retention of the color coating and thereby preserves the integrity and any information applied thereto by laboratory technicians.

It should be noted that although the color coating is applied to one of the upper and lower surfaces of the transparent slide, the actual color coating does not appear the same when viewed from the opposite side of the slide. To facilitate the identification of the portion of the slide which is actually color coated, a marking or other printed indicia may be applied to an area of the color coating to further facilitate the identification of that portion of the slide which includes the true color coating.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A microscope slide comprising:
   a body portion having upper and lower surfaces each defining a plane,
   a segment of said upper surface including a first frosted surface area which does not extend outwardly beyond said plane defined by said upper surface;
   a segment of said lower surface including a second frosted surface area which does not extend outwardly beyond said plane defined by said lower surface; and
   a color coating applied to said first frosted surface area in such a manner as to form a coated frosted surface area which does not extend outwardly beyond said plane of said upper surface whereby said coated frosted surface area and said second frosted surface area may selectively receive indicia thereon.

2. The microscope slide of claim 1 wherein said first and second frosted surface areas are generally aligned with respect to one another through said body portion of the slide.

3. The microscope slide of claim 2 wherein said coated frosted surface area and said second frosted surface area are recessed with respect to the planes defined by said upper and lower surfaces, respectively.

4. The microscope slide of claim 1 wherein said coated frosted surface area and said second frosted surface area are recessed with respect to the planes defined by said upper and lower surfaces, respectively.

* * * * *